United States Patent

Sakimori et al.

[11] Patent Number: 4,845,821
[45] Date of Patent: Jul. 11, 1989

[54] ASSEMBLING APPARATUS

[75] Inventors: Hideharu Sakimori, Hiroshima; Yoji Komatsu, Yamaguchi; Daijiro Ida, Narashino; Seiji Takahashi, Sakura, all of Japan

[73] Assignee: Mazda Motor Corporation, Hiroshima, Japan

[21] Appl. No.: 78,763

[22] Filed: Jul. 28, 1987

[30] Foreign Application Priority Data

Jul. 30, 1986 [JP] Japan .................. 61-180872

[51] Int. Cl.$^4$ .......................... B23P 19/04
[52] U.S. Cl. ................... 29/213.1; 29/281.1
[58] Field of Search .......... 29/213 R, 281.1, 33 P, 29/564, 771, 791, 793, 822; 198/345; 901/50; 269/56, 13

[56] References Cited

U.S. PATENT DOCUMENTS 3,636,615 1/1972 Rothwell .................. 29/213 R
4,411,354 10/1983 Thibuult et al. .............. 901/50
4,651,396 3/1987 Kerlidou .................. 29/213 R
4,667,805 5/1987 Antoszewski .............. 198/395

FOREIGN PATENT DOCUMENTS

60-238237 11/1985 Japan .

Primary Examiner—Robert C. Watson
Attorney, Agent, or Firm—Fleit, Jacobson, Cohn, Price, Holman & Stern

[57] ABSTRACT

An assembling apparatus for incorporating a component into a work by utilizing an assembling manipulator comprising hand for clamping the component having a circular system and a disc portion at one end of the stem wherein the assembling apparatus is provided with containers for storing the components, said hand including picking up clamp member for clamping the component to pick up from the container, and centering clamp member for clamping the component picked up by the picking up clamping member to center and incorporate the component into the work. By utilizing the apparatus, the automatic positioning, centering and incorporating of the component to the work can be facilitated.

19 Claims, 8 Drawing Sheets

ASSEMBLING APPARATUS

FIELD OF THE INVENTION

The invention relates to an assembling apparatus, and specifically to an apparatus for incorporating a component having a stem and a disc portion at one end of the stem.

BACKGROUND OF THE INVENTION

Recently, in the field of automobile production, assembling manipulators have been introduced in order to automate the parts assembling process. For instance, in an assembling process in which a component having a stem and a disc portion at one end thereof, such as intake and exhaust valves of an automobile engine, is clamped by a manipulator hand to be incorporated into a cylinder head, many manipulators have been proposed to accomplish automate the process. Japanese Patent Public Disclosure No. 60-238237, laid open to the public on Nov. 27, 1985, proposed an assembling manipulator by which a valve disc is suctioned by negative pressure to a manipulator hand so that the valve can be incorporated into a cylinder head. However, the disclosed manipulator does not provide a mechanism for positioning the valve disc and manipulator hand. Since the valve must be centered when the valve disc is suctioned to the manipulator hand, the lack of a mechanism for positioning the valve disc and manipulator hand may impede centering accuracy so that it is difficult to effectively automate the assembling process.

SUMMARY OF THE INVENTION

It is, therefore, an object of the present invention to provide an automatic apparatus in which a component can be automatically incorporated into a work.

Another object of the invention is to provide an automatic assembling system for transferring, positioning centering and incorporating a component into a work.

According to the present invention, the above and other objects can be accomplished by an assembling apparatus for incorporating a component into a work by utilizing an assembling manipulator comprising hand means for clamping a component having a stem and a disc portion at one end of the stem the assembling apparatus is provided with containers for storing the components, the disc of each component being substantially vertically disposed with the disc portion upward and carried by the stem. The hand means includes picking up clamp means for clamping the component to be picked up from the container, and centering clamp means for clamping the component picked up by the picking up clamp means to center and incorporate the component into the work.

According to the features of the present invention, a component such as an intake valve or an exhaust valve is picked up from the container by the picking up clamp means at the disc portion thereof, and thereafter the centering clamp means center and incorporate the component into the work, thereby automating the assembling process.

Further features and advantages of this invention will become more readily apparent to those skilled in the art when taken in conjunction with accompanying drawings.

BRIEF DESCRIPTION OF THE DISCLOSURE

DESCRIPTION OF THE PREFERRED EMBODIMENTS

Figure 1:
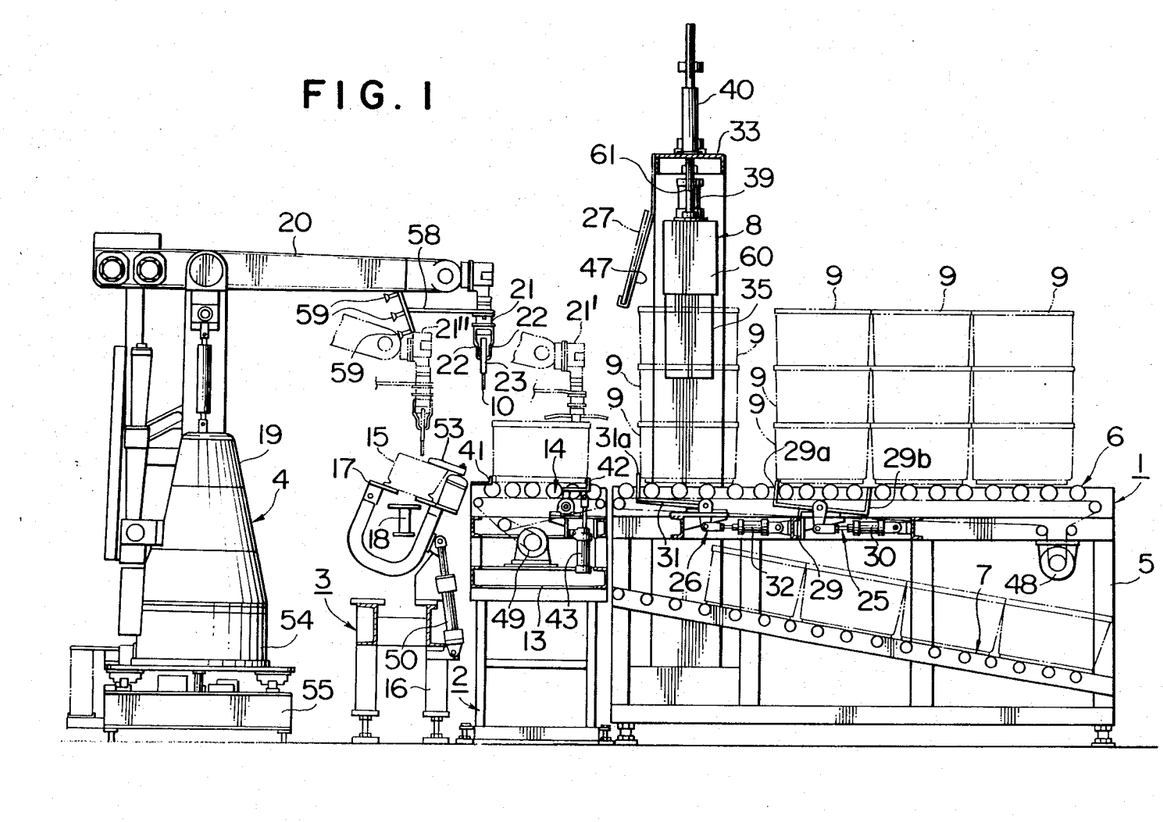
FIG. 1 is an elevational view of an assembling apparatus in accordance with the present invention.
Figure 2:
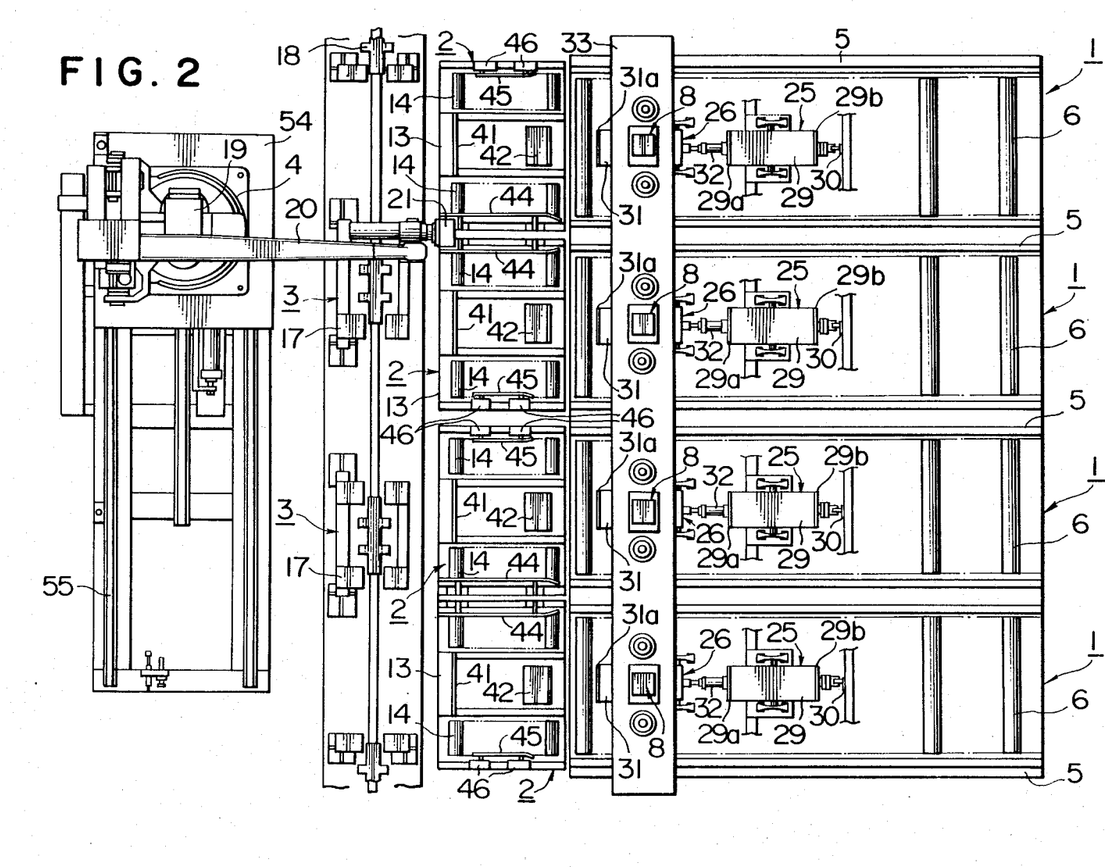
FIG. 2 is a plan view of the assembling apparatus of FIG. 1.

Referring to the drawings in general and FIGS. to 1 and 2, in particular there is shown an assembling apparatus provided with transfer 1 for transferring containers 9, storing valve 10 to be incorporated into cylinder head 15, positioning device 2 for positioning the containers 9 at a location from which the valve 10 can be picked up, assembling station 3 for carrying the cylinder head 15 into which the valve 10 is incorporated, and assembling manipulator 4 for incorporating the valve 10 into the cylinder head 15.

In this embodiment, although there are disposed four sets of the transfers 1 and positioning devices 2, hereafter the description refers to one set thereof.

The transfer 1 is provided with a base 5, a friction conveyer 6 located above the base 5 for transferring three decker containers 9 successively, a lifter 8 disposed adjacent to the terminal of the conveyer 6 for lifting the container 9, and a wheel conveyer 7 located below the base 5 for returning empty containers 9.

Figure 3:
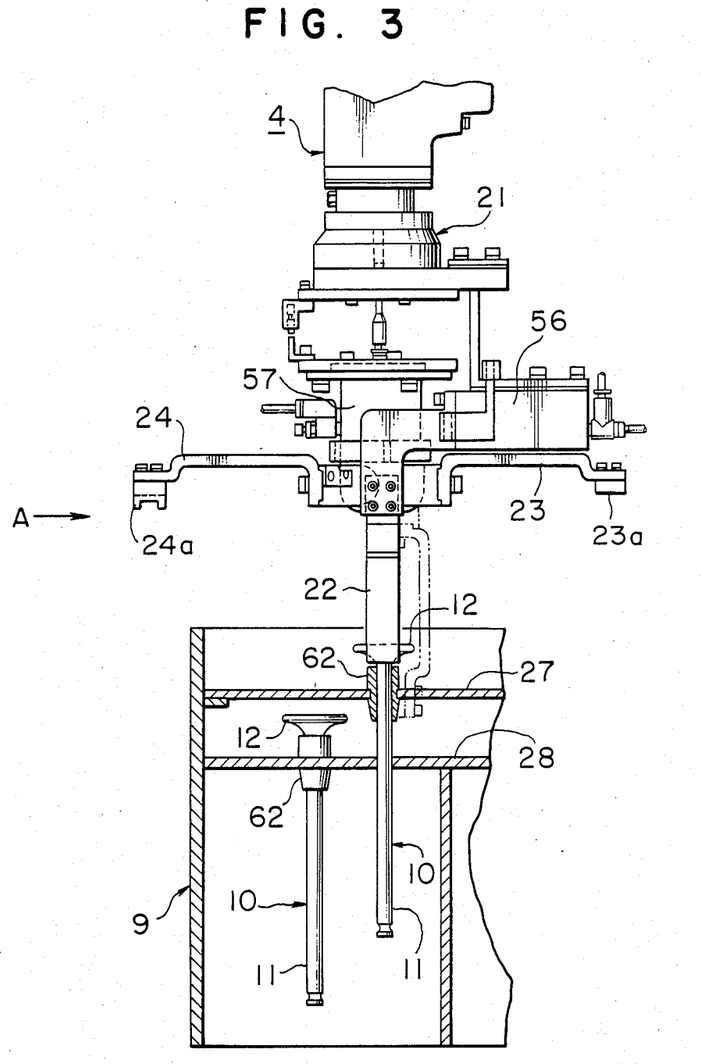
FIG. 3 is an elevational view partly showing the assembling apparatus of the present invention in which a component has been removed from the container.
Figure 4:
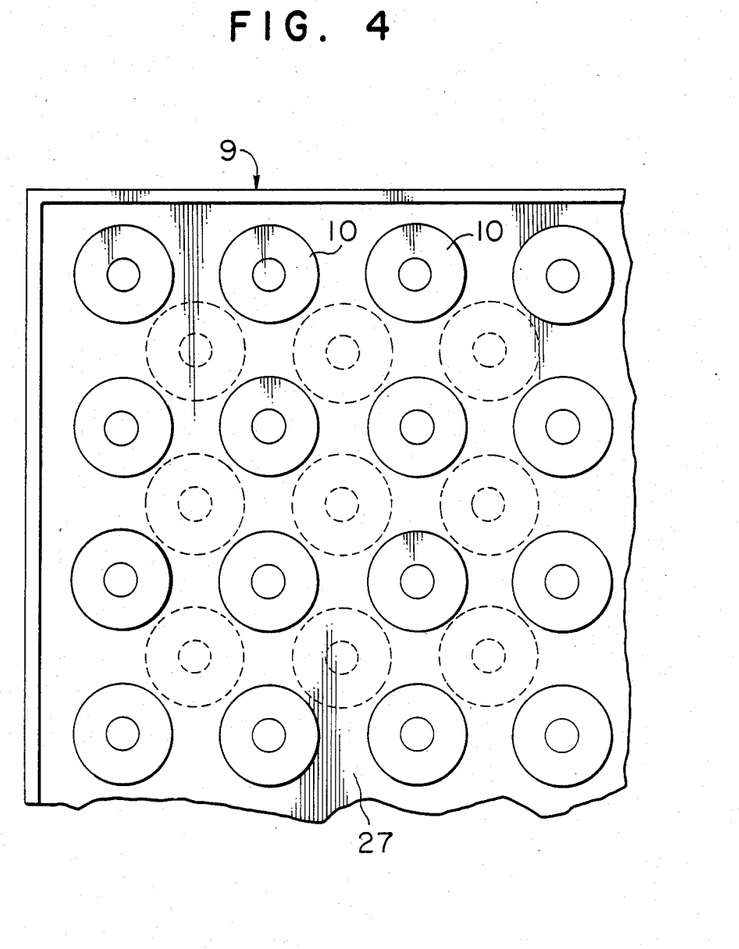
FIG. 4 is an enlarged partial plan view of the container.

As shown in FIG. 3 and FIG. 4, the container can store the two decks of valves 10. The container 9 is provided with a lower plate 28 and a removable plate 27 on which a plurality of bushes 62 are mounted. The bush 62 holds a stem 11 of the valve 10 with a disc portion 12 of the valve 10 upward.

Above the base 5, a first stopper mechanism 25 is provided for stopping the container 9 temporarily before the lifter 8 transmits the containers 9 one by one, and a second stopper 26 for stopping the container 9 temporarily to position the container at a position corresponding to the lifter 8.

The first stopper 25 is provided with a swingable member 29 pivotally supported at the middle portion thereof. The swingable member 29 is formed with a front engaging tip 29a for engaging the front end portion of the container 9 at the lowermost and frontmost position in the transferring direction of the container 9, and a rear engaging tip 29b for engaging the front end portion of the container at the lowermost and second front position. The first stopper 25 is also provided with an air cylinder 30 for swinging the swingable member 29.

The second stopper 26 is provided with a swingable member 31 formed with an engaging tip 31a at the front end, and an air cylinder 32 for swinging the the swingable member 31. The air cylinder 32 is engaged with the swingable member 31 at the rear end portion of the swingable member 31. The engaging tip 31 is adapted to be engaged with the front and lower end of the container 9 at the lowest deck of the three-decker containers 9 transferred to the position corresponding to the lifter 8 so that the container 9 is stopped temporarily at that position.

Figure 5:
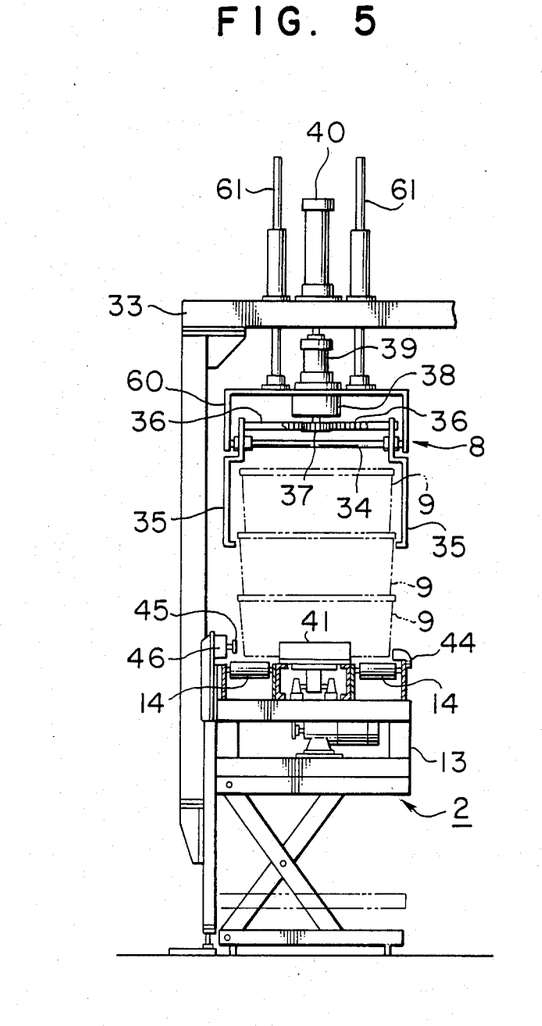
FIG. 5 is an elevational view of a lifter of the assembling apparatus shown in FIG. 1.

The lifter 8 is mounted on a frame 33 and, as shown in FIG. 5, is provided with a pair of arms 35 slidably engaged with a horizontal bar 34 which is movably supported relative to the frame 33, racks 36 mounted on the upper end of the arms 35 and parallel to each other, a pinion 37 disposed between the racks 36 to be brought into a meshing engagement with the racks 36, a rotary actuator 38 for rotating the pinion 37, and an air cylinder 40 for driving the actuator 38. A frame 60 is provided for supporting the bar 34 and a guide rod 61 is provided for supporting the frame 60 when rising and falling. The frame 33 is provided with brakets 47 on which the removable plate 27 of the container 9 is placed after the removing the upper deck of the valves 10, as shown in FIG. 1.

In operation, the air cylinder 40 of the lifter 8 moves the horizontal bar 40 downwardly to position the arms 35 in the vicinity of the side of the container 9 which is located at the lowest position. Thereafter, the arms 35 are brought into engagement with the container 9 by means of the actuator 38, pinion 37 and racks 36 to remove the upper containers 9 leaving the lowest one.

The container 9 left on the friction conveyer 6 is transferred toward the positioning device 2. The positioning device 2, as shown in FIG. 5, is provided with a saddle 13 movable between the upper surface of the conveyer 6 and the upper surface of the conveyer 7. A pair of roller conveyers 14 are disposed on the saddle 13. A fixed engaging member 41 and a movable engaging member 42 are provided between the roller conveyers 14 for positioning the containers 9 fed from the transfer 1, as shown in FIGS. 1 and 5. The engaging member 42 is adapted to engage with and disengage from the rear and lower end portions of the container 9. A fixed engaging member 44 and movable engaging member 45 are provided at the opposite sides of the saddle 13 for positioning the container 9 in the right and left directions. The movable engaging member 45 is adapted to urge the side surface of the container 9 toward the fixed engaging member 44 by means of the air cylinder 46. The saddle 13 is moved downwardly when all the valves 10 are taken out of the container 9 and transmits the container toward the wheel conveyer 7 for returning the vacant or unloaded container 9 back. There are provided driving sources 48 and 49 for driving the friction conveyer 6 and the roller conveyers 14.

Figure 6:
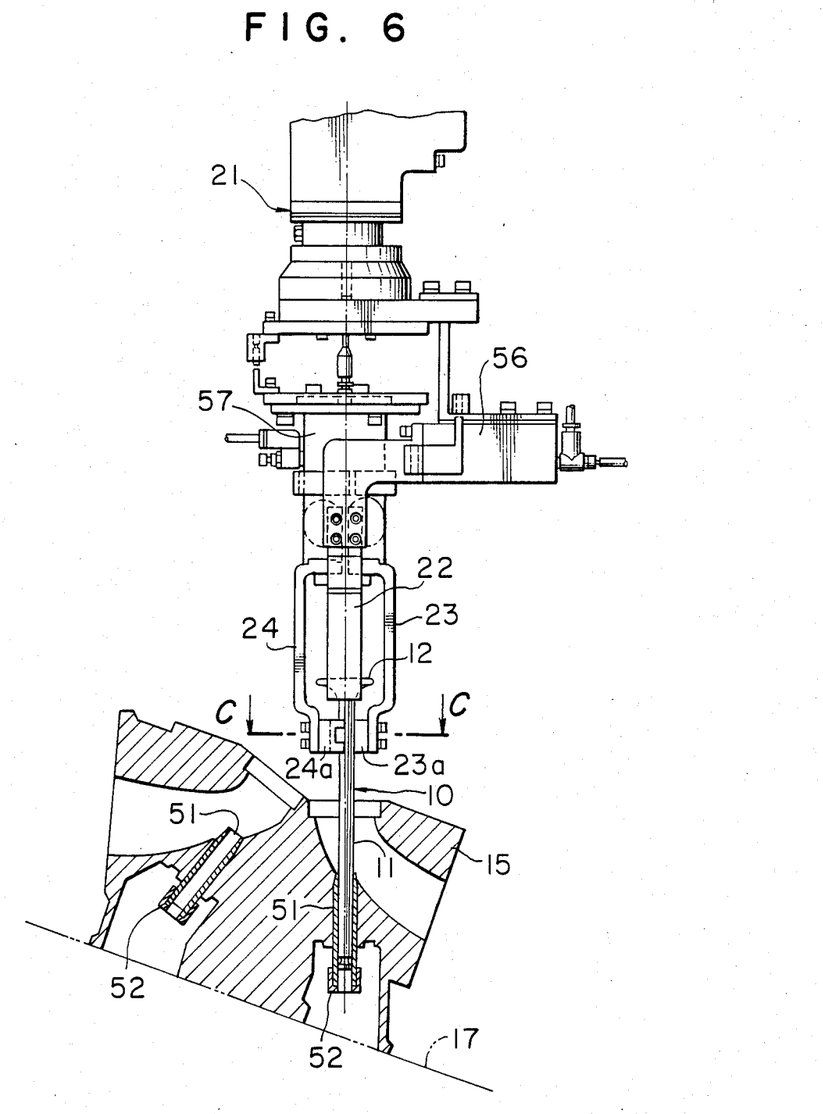
FIG. 6 is an enlarged partial side view of the assembling apparatus shown in FIG. 3.

As shown in FIGS. 1 and 2, the assembling station 3 is provided with a lift and carry type transfer 18 for transferring the cylinder head 15 into which the valve 10 is incorporated, a movable base 17 for rigidly supporting the cylinder head 15 in a position whereat the valve 10 can be properly incorporated into the cylinder head 15, and a fixed base 16 for carrying the movable base 17 at any angle. One upper end portion of the movable base 17 is pivotally connected with the fixed base 16 and the other upper end portion of the base 17 is connected with the fixed base 16 through an air cylinder 50. The movable base 17 can be slanted in two directions thereof in accordance with the drive of the air cylinder 50 so that valve guides 51 mounted on the cylinder head 15 can be held in upright positions corresponding to the respective slants of the cylinder head 15, as shown in FIG. 6. In FIG. 6, there is provided a sealing member 52 mounted at one end of the valve guides 52. In FIG. 1, numeral 53 denotes a clamp for securing the cylinder 15.

Referring now to FIGS. 1 and 2, the manipulator 4 is provided on the carriage 54 movably disposed between the two assembling stations 3. The manipulator 4 includes a main body 19, an arm 20 connected to the upper end of the main body 19 and a hand 21 formed at the tip end of the arm 20. Further, there is provided a guide rail 55 on which the carriage can move.

Figures 7, 8, 9:
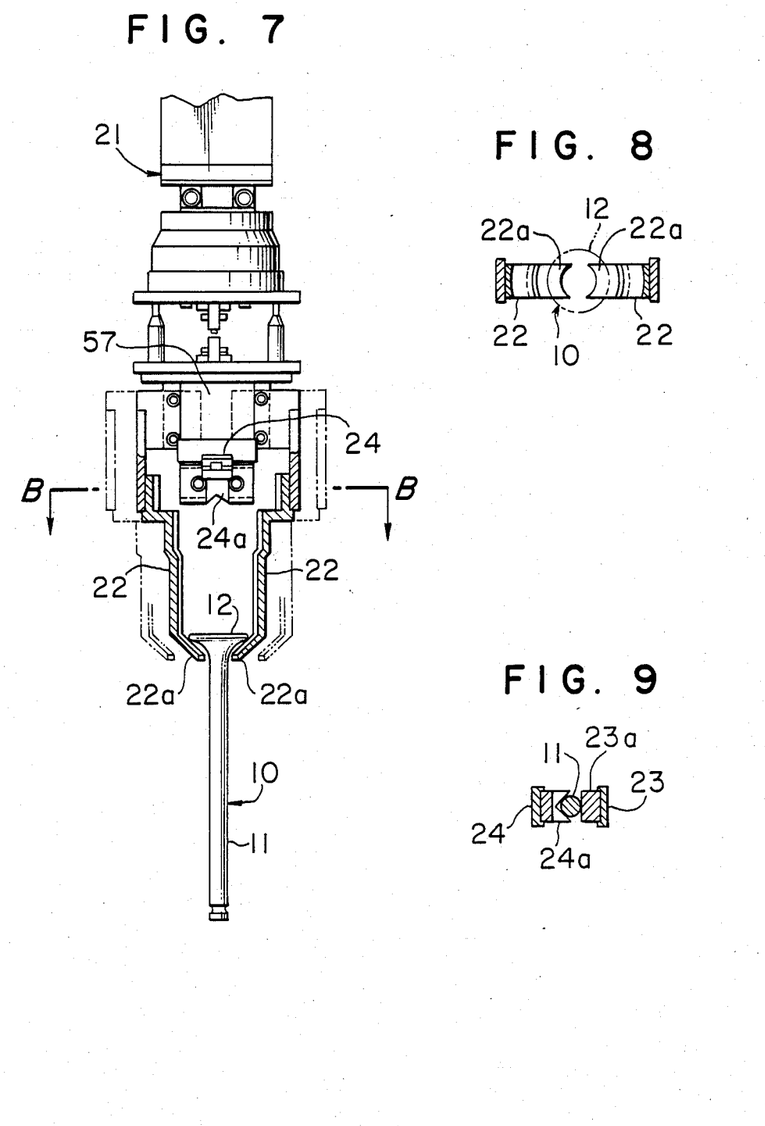
FIG. 7 is a partial sectional side view of the assembling apparatus in the direction of arrow A in FIG. 3.
FIG. 8 is a sectional view taken along ling B—B in FIG. 7.
FIG. 9 is a sectional view taken along line C—C in FIG. 6.
Figure 10:
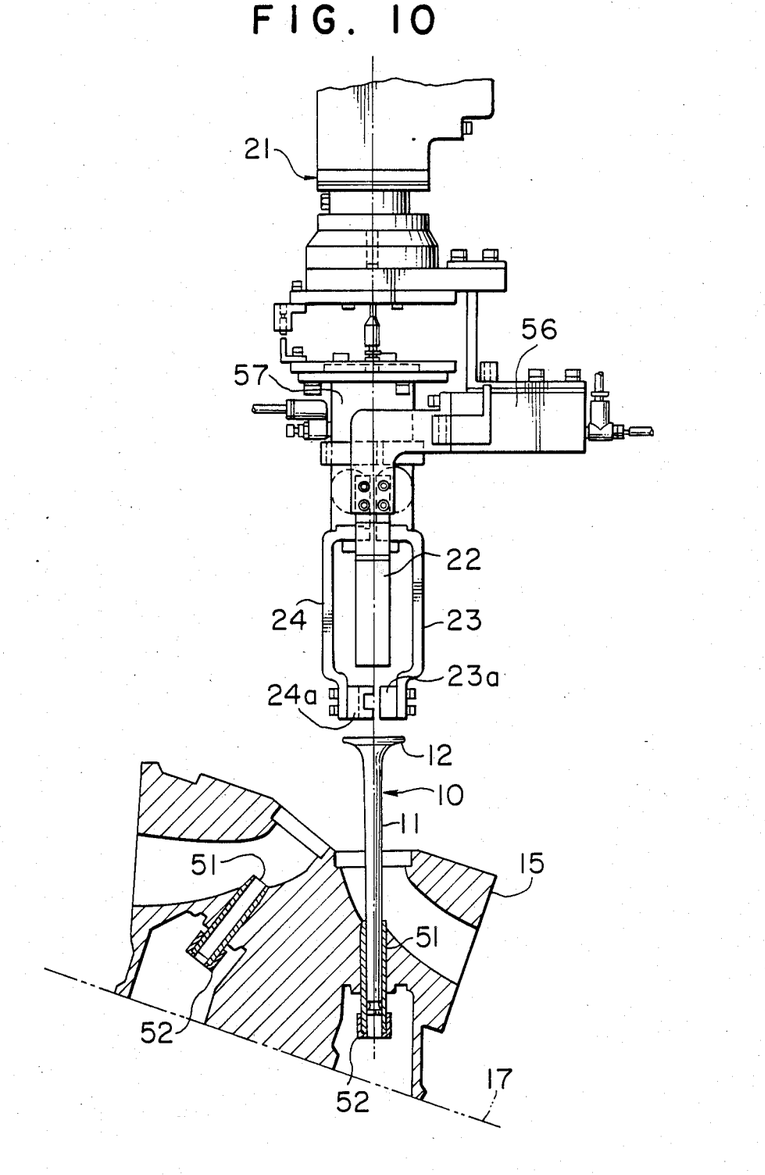
FIG. 10 is an enlarged partial side view of the assembly apparatus shown in FIG. 3.

As shown in FIG. 3, the hand 21 is provided with a pair of picking up clamp members 22 for picking up the valve 10 from the container 9 by clamping the disc portion 12 thereof, and a pair of centering clamp means 23, 24 for centering the valve 10 taken out of the container 9 and incorporating the valve 10 into the cylinder head 15. As shown in FIG. 1, the hand 21 moves to a position 21' when picking the valve 10 up from the container 9, and to a position 21" when incorporating the valve 10 into the cylinder head 15. Each picking up clamp means 22 is formed with a claw 22a at the tip end portion for picking up the valve 10, as shown in FIG. 7 and 8. Clamp means 22 is movably supported in a direction parallel to the hand 21 and is driven by an actuator 56.

On the other hand, centering clamp means 23, 24 are swingably mounted on the hand 21 in a direction perpendicular to the direction of the sliding movement of the picking up clamp means 22 so that centering clamp means 23, 24 can swing in a 90 degree range so that centering means 23 and 24 can assume upright and horizontal positions. Centering clamp means 23 and 24 are adapted to be swung by an actuator 57. Centering means clamp 23 and 24 are provided with claws 23a and 24a, respectively, at the tip end portions thereof. Centering means clamp 23 and 24 are so constituted that the claws 23a, 24a are located below the lower ends of the picking up clamp means 22 when clamp means 23 and 24 are in the upright position. As shown in FIG. 9, the claw 23a has a flat tip end by which the claw 23a is brought into engagement with the stem 11 of the valve but the claw 24a has a V-shaped tip end to facilitate centering when the stem 11 is clamped by clamp means 23 and 24.

In this embodiment, there are provided suction hand 58 for suctioning the removable plate 27 disposed on the brakets 47 to return into the container 9. The suction hand 58 is provided with four suction pads 59 for suctioning the removable plate 27.

In operation, the three decker containers 9 are transferred on the friction conveyer 6. Thereafter, a set of the three decker containers 9 is separated from a chain of the three decker containers 9 by means of the first stopper 25 so that the set of the three decker container 9 is placed at a position corresponding to the lifter 8. In that position, the lowest container 9 is separated from the three decker container by means of the lifter 8 and the second stopper 26 is transferred toward the positioning device 2 and is arranged at a desirable position. The valve 10 is picked up from the positioned container 9 with clamp means 22 clamping the disc portion 12. At this time, centering clamp means 23 and 24 are maintained in a horizontal position.

Next, while the valve is clamped by the picking up clamping means 22 at the disc portion 12 thereof, centering clamping means 23 and 24 are swung toward the pependicular position thereof so as to clamp the stem 11 of the valve 10 by the claws 23a and 24a to center the valve (see FIG. 6). Thereafter, the stem 11 of the valve 10 is inserted into the valve guide 51 mounted on the cylinder head 15 fixed to the assembling station 3 by means of the manipulator 4. Then, the valve 10 is disengaged from centering means clamp 22, 23 and 24. Thereafter, the centering means clamp 23 and 24 are swung toward the upright position and urged against the top end of the disc portion 12 of the valve 10 by the lower end surface of centering means 23 and 24 so that the valve is inserted and incorporated into the valve guide 51 against the friction in the valve guide 51 and the sealing member 52. This incorporating work and the valve picking up work are carried out every time the cylinder head 15 is transferred to the assembling station 3. When all the valves 10 of the upper deck of the container 9 are taken out, the removable plate 27 is suctioned by the suction hand 58 comes to rest on the brakets 47 by means of the hand (see FIG. 1). Then the valves 10 on the lower deck of the container are treated as stated above. When all the valves 10 are taken out of the container 9, the removable plate 27 is returned to the container 9. Thereafter, the saddle 13 is moved downwardly so that the vacant container 9 is transferred to the wheel conveyer 7, which serves as returning conveyer.

As described above, the process of transferring the valve 10, picking up the valve 10 from the container 9, positioning and incorporating the valve 10 into the cylinder head 15, and returning the vacant container 9 can be carried out automatically.

We claim:

1. An assembling apparatus for incorporating a component into a work, said assembling apparatus comprising:
an assembling manipulator including hand means for clamping the component having a stem and a disc portion at one end of the stem wherein the assembling apparatus is provided with containers for storing the components in which the disc portion of each component is substantially vertically disposed with the disc portion upward and carried by the stem, said hand means including picking up clamp means for clamping the component to be picked up from the container, and centering clamp means for clamping the component picked up by the picking up clamp means to center and incorporate the component into the work, the stem of the component being of a true circle in cross-section and one of the centering clamp means having a flat tip end and another of the centering clamp means having a V-shaped tip end by which the stem is clamped.

2. An assembling apparatus for incorporating a component into a work by utilizing an assembling manipulator comprising hand means for clamping the component having a stem and a disc portion at one end of the stem wherein the assembling apparatus is provided with containers for storing the components in which the disc of each component is substantially vertically disposed with the disc portion upward and carried by the stem, said hand means including picking up clamp means for clamping the component to be picked up from the container, and centering clamp means for clamping the component picked up by the picking up clamp means to center and incorporate the component into the work, said centering clamp means being located below the picking up clamp means when the centering clamp means clamps the component, the picking up clamp means carrying the disc portion of the component, the centering clamp means carrying the stem portion of the component, the pickup up clamp means and the centering clamp means being provided on the assembling manipulator, the component being positioned by the centering means relative to the assembling manipulator.

3. An assembling apparatus in accordance with claim 2 in which the stem of the component is of a true circle in cross-sectional and one of the centering clamp means is of a flat tip end and the other is of a V-shaped tip end by with the stem is clamped.

4. An assembling apparatus in accordance with claim 2 in which said centering clamp means is located below the picking up clamp means when the centering clamp means clamps the component.

5. An assembling apparatus in accordance with claim 2 in which the centering clamp means is provided at the lower end with a surface for urging against the component in an upright position.

6. An assembling apparatus in accordance with claim 2 in which the component is an intake or exhaust valve for automotive engine.

7. An assembling apparatus in accordance with claim 2 in with the work is a cylinder head for automotive engine.

8. An assembling apparatus in accordance with claim 2, further comprising a first drive means for moving the picking up clamp means between a first position at which the picking up clamp means picks up the component by engaging a lower end portion of the disc portion of the component and a second position in which the picking up clamp means is kept away from the component, and a second drive means for moving the centering clamp means between a first position at which the centering clamp means positions the component and a second position at which the centering clamp position is kept away from the component.

9. An assembling apparatus in accordance with claim 8, in which said picking up clamp means is moved toward and away from the component in a horizontal direction between the first and second posit thereof, and centering clamp means being swung between the first and second position thereof about an upper end portion thereof.

10. An assembling apparatus for incorporating a component into a work by utilizing an assembling manipulator comprising hand means for clamping the component having a stem and a disc portion at one end of the stem wherein the assembling apparatus is provided with containers for storing the components in which the disc of each component is substantially vertically disposed with the disc portion upward and carried by the stem, said hand means including picking up clamp means for clamping the component to be picked up from the container,a and centering clamp means for clamping the component picked up by the picking up clamp means to center and incorporate the component into the work, said centering clamp means being located below the picking up clamp means when the centering clamp means clamps the component, the picking up clamp means carrying the disc portion of the component, the centering clamp means carrying the stem portion of the component, the picking up clamp means and the centering clamp means being provided on the assembling manipulator, the component being positioned by the centering means relative to the assembling manipulator, the component being an intake or exhaust valve for an automotive engine, the work being a cylinder head for the automotive engine.

11. An assembling apparatus in accordance with claim 10, further comprising a first drive means for moving the picking up clamp means between a first position at which the picking up clamp means picks up the component by engaging the disc portion of the component and a second position in which the picking up clamp means is kept away from the component, and a second drive means for moving the centering clamp means between a first position at which the centering clamp means positions the component and a second position at which the centering clamp position is kept away from the component.

12. An assembling apparatus in accordance with claim 8, in which said picking up clamp means is moved toward and away from the component in a horizontal direction between the first and second position thereof, and centering clamp means being swung between the first and second position thereof about an upper end portion thereof.

13. An assembling apparatus in accordance with claim 2, in which the picking up clamp means and the centering clamp means are driven by air cylinder means.

14. An assembling apparatus in accordance with claim 10, in which the picking up clamp means and the centering clamp means are driven by air cylinder means.

15. An assembling apparatus in accordance with claim 1, wherein said centering clamp means is located below the picking up clamp means when the centering clamp means clamps the component.

16. An assembling apparatus in accordance with claim 15, wherein the centering clamp means is provided with a surface for urging against the component in an upright position.

17. An assembling apparatus in accordance with claim 1, wherein the component is an intake or exhaust valve for an automotive engine.

18. An assembling apparatus in accordance with claim 1, wherein the work is a cylinder head for an automotive engine.

19. An assembling apparatus for incorporating a component into a work, said assembling apparatus comprising:

an assembling manipulator including hand means for clamping the component having a stem and a disc portion at one end of the stem wherein the assembling apparatus is provided with containers for storing the components in which the disc portion of each component is substantially vertically disposed with the disc portion upward and carried by the stem, said hand means including picking up clamp means for clamping the component to be picked up from the container, and centering clamp means for clamping the component picked up by the picking up clamp means to center and incorporate the component into the work and the work being a cylinder head for an automotive engine.

* * * * *